Oct. 17, 1967

E. J. HAWKINS 3,347,245

FILTER CIGARETTE

Filed Dec. 27, 1965

INVENTOR.
EDWARD J. HAWKINS
BY
Lynn H. Latta
ATTORNEY

Oct. 17, 1967 E. J. HAWKINS 3,347,245
FILTER CIGARETTE
Filed Dec. 27, 1965 2 Sheets-Sheet 2

INVENTOR.
EDWARD J. HAWKINS
BY
ATTORNEY

United States Patent Office 3,347,245
Patented Oct. 17, 1967

3,347,245
FILTER CIGARETTE
Edward J. Hawkins, 89 15th St.,
Hermosa Beach, Calif. 90254
Filed Dec. 27, 1965, Ser. No. 525,004
6 Claims. (Cl. 131—10.7)

ABSTRACT OF THE DISCLOSURE

Disclosed herein is a cigarette filter composed essentially of molecular sieve in a partially moisture-saturated state, loaded (in the pores thereof) with a silicone liquid such as di-methyl polysiloxane, having an affinity for harmful gaseous components of tobacco smoke, such as pyrobenzenes.

---

This application is a continuation in part of my application Ser. No. 381,961, filed July 13, 1964, now abandoned, for Filter Cigarette and Method of Making the Same.

This invention relates to filter cigarettes and has as its general object to provide a cigarette filter of improved filtering capacity. The invention relates particularly to a cigarette filter of improved filtering and molecular adsorption material.

Filter cigarettes in common use at the present time utilize a charcoal or cellulose fiber filter material. Such filters can remove only a portion of the tars and other deleterious materials carried by the cigarette smoke, and apparently are not subject to being improved sufficiently to remove substantially all of the harmful gaseous or solid substances.

The present invention, in general, contemplates the use of a filter material commonly known as "molecular sieve," namely, a synthetic zeolite which is an alkali metal aluminosilicate as hereinafter more specifically identified.

I have found that molecular sieve material in its active state as used in drying processes is wholly unsuitable for use as a filter in a cigarette. Furthermore, over the normal period of time in which cigarettes are distributed and purchased by the consumer, the fully active molecular sieve will dry out the tobacco in the cigarette to the point where combustion is accelerated far beyond the normal slow burning rate which is an essential to the derivation of the expected pleasurable sensation of smoking.

Notwithstanding this completely objectionable nature of common active molecular sieve as a filter material for cigarettes, I have discovered that by using a specially treated molecular sieve material of a specially selected particle size range, in a substantially or partially inactive state, it becomes an ideal material for a cigarette filter in that it will remove by selective adsorption a large percentage of the tars and other harmful gaseous ingredients of tobacco smoke and yet will leave the tobacco flavor and the normal moisture content of the smoke unimpaired to the extent that the smoking process has a pleasurable sensation as distinguished from that of smoking an unfiltered cigarette.

With the foregoing in mind, the invention aims to provide a cigarette filter having an extremely high efficiency in filtering out harmful substances from cigarette smoke without impairing the flavor and normal moisture content of the smoke. The molecular sieve being highly adsorbent, and having an especially great affinity for hydrocarbons in either gaseous or solid state, is applied here to effect the removal of the suspect carcinogenous materials.

A further object of the invention is to provide a cigarette filter utilizing a specially prepared molecular sieve containing within its pores a silicone which improves the adsorption affinity for harmful ingredients of tobacco smoke including especially gaseous hydrocarbons such as the benzopyrenes, and di-benzopyrenes.

Other objects and advantages which will become apparent in the ensuing specification and appended drawing in which.

Figure 1:
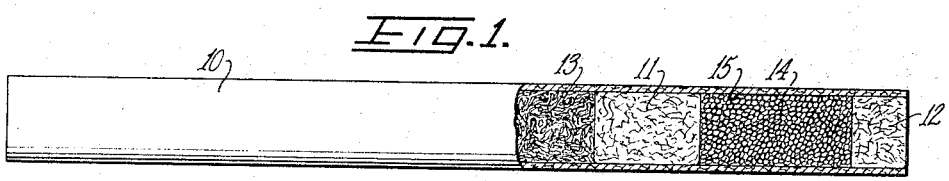
FIG. 1 is a view, partially in axial section, of a cigarette embodying my invention.

Referring now to FIG. 1 of the drawing, I have shown therein, as an example of one form in which the invention may be embodied, a cigarette comprising a tubular wrapper 10, a barrier wad 11 of cellulose material (matted cellulose fibers) spaced from a closure wad 12 of similar material plugging the tip of the cigarette; a cylindrical body of tobacco 13 extending from the barrier wad 11 to the other end of the cigarette (the end that is ignited); and a body of treated molecular sieve granules 14 filling a chamber 15 which is defined within the wrapper 10 between the wads 11 and 12.

I have found by experimentation that molecular sieves of particle sizes smaller than about 40 mesh on a Tyler screen are unsuitable for use in a cigarette filter, the taste of the smoke drawn through such fine particles being entirely too disagreeable to be acceptable. Further experimentation has indicated that the best range is 30/40 mesh particle size. The undesirable characteristic of the fine-mesh sieves arises from the adsorption of a large percentage of the aromatic-carrying gases so as to render the smoke substantially tasteless. Unpleasant aspects of taste are accentuated by removal of the pleasing aroma characteristics tending to mask the unpleasant characteristics.

The granules of molecular sieve 14 are specially prepared by me to a size falling within the range of sizes between 30 and 40 mesh on a Tyler screen, providing maximum purifying efficiency and preserving aroma while avoiding the escape of particles into the interstices of the wads 11 and 12. The filter material is a synthetic zeolite, namely an alkali metal aluminosilicate, equivalent to one of several molecular sieves produced by Linde Division of Union Carbide and Chemical Corporation, having the following formulae: Linde type 4A—0.96–0.04 $Na_2O \cdot 1.00$ $Al_2O_3 \cdot 1.92$–0.09 $SiO_2 \cdot xH_2O$; type 5A—produced from type 4A through ion exchange of about 75% of the sodium ions by calcium ions; and type 13X, the general chemical formula for which is 0.83–0.05 $Na_2O:1.00$ $Al_2O_3 \cdot 2.28$–0.03 $SiO_2 \cdot xH_2O$. Such molecular sieves have a pH of approximately 10 and are stable in the 5 to 12 pH range.

Type 4A and type 5A have the A crystal structure which is cubic, $a_0=12.32$ angstroms, space group 01/H–Pm3m characterized by a 3-dimensional network, consisting of cavities 11.4 angstroms in diameter separated by circular openings (pores) 4.2 angstroms in diameter (pore diameter). Removal of crystal water leaves mutually connected intracrystalline voids amounting to 45 vol.-percent of the zeolite. All adsorption takes place in the intra-crystalline voids.

Type 13X has the X crystal structure which is cubic, $a_0=24.95$ angstroms, space group 07–Fd3m, characterized by a 3-dimensional network with mutually connected intra-crystalline voids accessible through openings (pores) which will admit molecules with critical dimensions up to 9 angstroms. The void volume is 51 vol.-percent of the zeolite and all adsorption takes place in the crystalline voids. Type 13X is especially suitable for the purposes of the invention, since it is effective for the adsorption of the specific gaseous hydrocarbons suspected of being carcinogenous.

For all three types the internal surface area is 700 to 800 square meters per gram and the external area is 1 to 3 square meters. The volume of the voids in cubic centimeters per gram is 0.28 for the A crystal structure and 0.35 for the X crystal structure.

The molecular sieve material is utilized in a substantially natural inactive state, i.e. having a substantially maximum or saturated moisture content, diminished only by sufficient drying so that the granular material is readily pourable. Preferably, I use a 13X Linde sieve.

The invention contemplates loading the molecular sieve particles with liquid phase chemicals having particular affinity for the noxious substances in tobacco smoke, and thereby imparting to the molecular sieve material a selective filtering characteristic, namely the ability to remove a relatively high percentage of the noxious substances as contrasted to a much lower degree of adsorption of materials (such as moisture) which are unobjectionable or in fact may be desirable for retention in the smoke. The invention contemplates using liquid phase chemicals for which the molecular sieve has an affinity so as to facilitate the loading of the sieve with these chemicals. These chemicals in turn have an affinity for the noxious substance in the smoke.

The loading of the sieve material with the liquid phase chemicals will effect partial saturation of the sieve material, reducing its capacity for adsorption of water moisture. It will be understood that in the substantially saturated state of the sieve particles as utilized by the invention they are apparently dry, the moisture present being in the form of water of crystallization.

Figure 8:
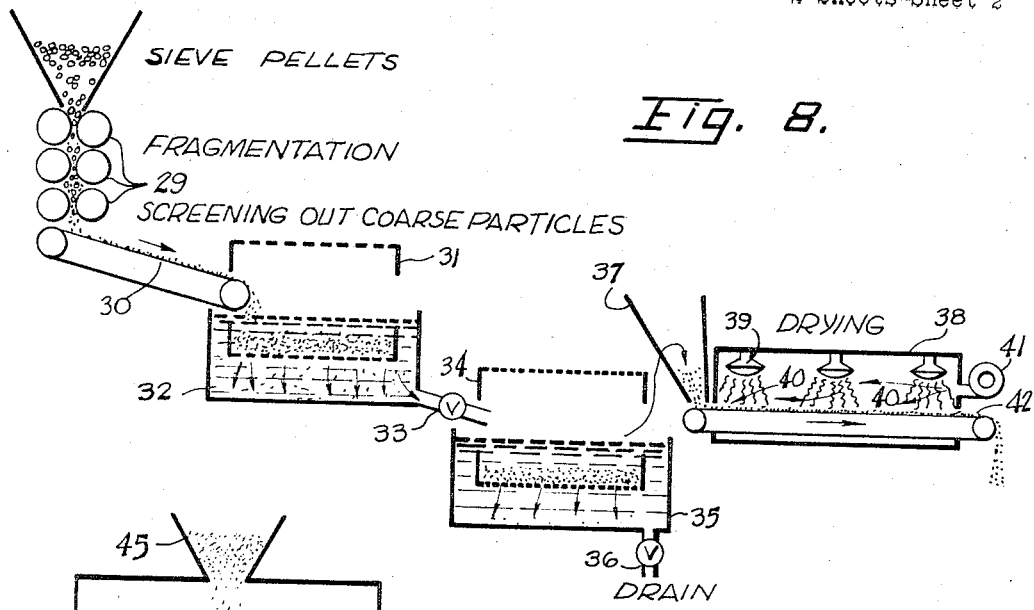
FIG. 8 is a schematic diagram illustrating the steps of preparing molecular sieve by fragmentation and drying.

My improved process of preparing the filter is as follows:

Pelletized sieve (FIG. 8) is fragmented between successive pairs of rolls 29 with successively diminished clearance between them, the last pair providing the maximum grain size (e.g. 30 mesh). In the fragmentation process, the sieve pellets are fractured, with the result that a substantial percentage of fines, smaller than the minimum mesh size (e.g. 40 mesh) are produced. These fines are removed by tumbling the fragmented material in drums of stainless steel screen, rotating on horizontal axes while submerged to half their depth in a water bath. The fragmented sieve is delivered, as at 30, into a screening drum 31 of coarse mesh and is screened through the drum 31 which retains the oversize particles and screens off the particles of useful size and the fines, which settle to the bottom of the bath 32 in which drum 31 rotates. The particles thus collected are then transferred as at 33 into a second drum 34 of the fine mesh, operating in a bath 35. The fines are screened off into the bath 35 and are thence disposed of by piping away from the bath as at 36, while the residue of particles retained within the drum 34 will have the range utilized by the invention.

Each batch of this residue is removed from the drum 34 and fed, e.g. from a hopper 37 into a drying tunnel 38 in which it is dried by suitable heating such as infrared radiation from a series of infra-red lamps 39, and by circulating an air stream 40 over the sieve particles to remove the moisture driven off by the heating. Air is circulated by suitable means such as a blower 41, from the discharge end of the tunnel 38 to the inlet end, the sieve being carried longitudinally through the drying tunnel by a suitable conveyor 42, e.g. a moving belt which passes the sieve particles under the infra-red lamps 39. The drying is extended sufficiently to remove all moisture including water of crystallization to an extent where only 2 or 3 percent remains. The infra-red lamps are on the far broadwave side of the infra-red spectrum, so as to heat the particles from the inside out to as great an extent as possible in using infra-red. The heating is restricted to temperatures below 650 degrees F., to avoid collapsing the sieve structure (the molecular structure of the crystal).

Figure 9:
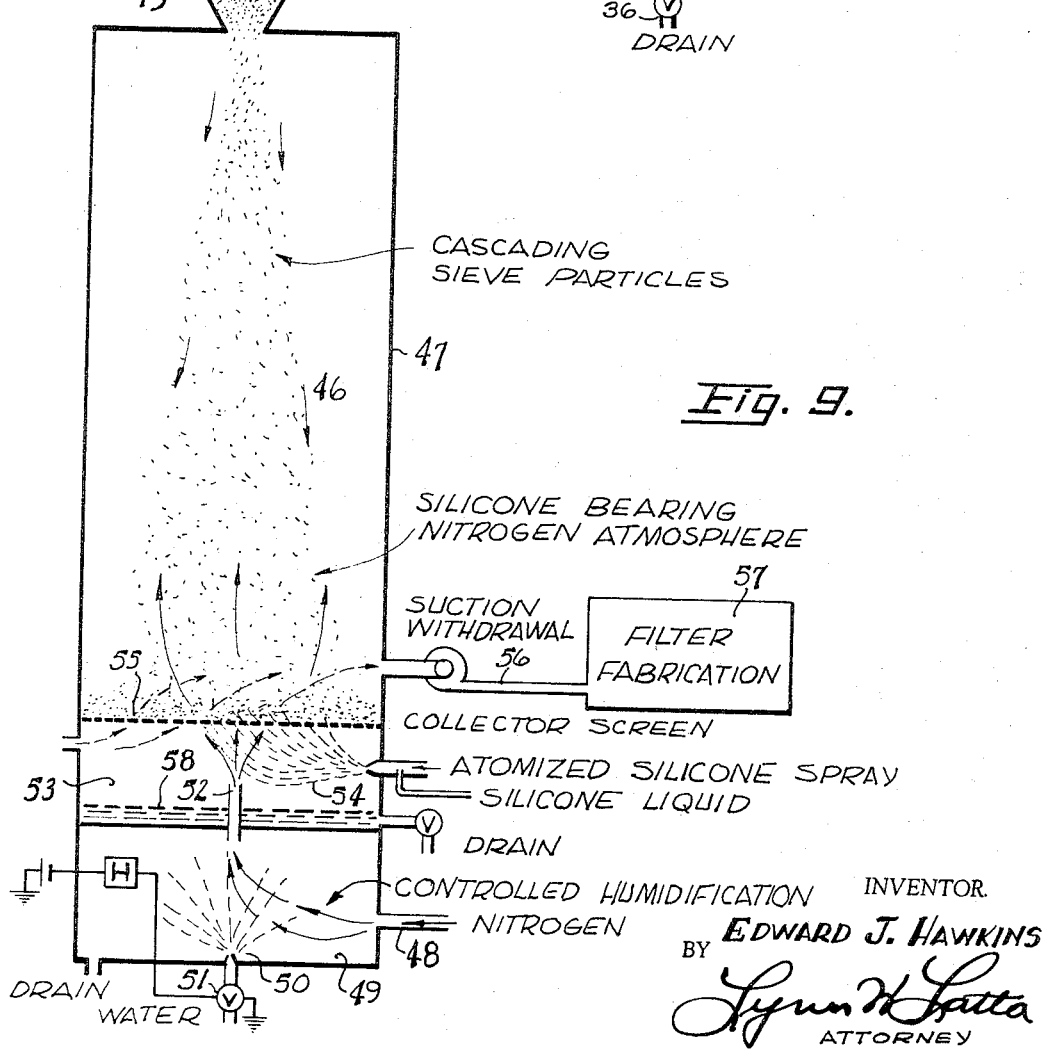
FIG. 9 is a schematic diagram illustrating the method of adding a limited amount of silicone liquid to the molecular sieve particles.

After the sieve has been dried as thoroughly as possible, it is then subjected to controlled moisture treatment (FIG. 9). From the discharge end of the drying belt, it is delivered into a closed hopper 45 from which it is cascaded as at 46 by gravity flow downwardly through a tower 47 in which it passes through an upwardly-moving atmosphere composed of atomized silicone mist carried by a body of nitrogen (ordinary air being excluded) to which has been added a controlled amount of moisture in the form of water vapor.

The nitrogen is fed at 48 into a vaporizing chamber 49 in which it is subjected to the introduction of controlled amounts of water vapor, as by a spray 50. The dew-point of the nitrogen is controlled as by means of a humidostat H in the chamber 49, regulating a valve 51 controlling the water spray 50. The moistened nitrogen is introduced (e.g. through an inlet 52) into a mixing chamber 53 where is subjected to an atomized spray 54 of silicone liquid, which is carried in suspension by the nitrogen gas because of the extremely small size of the silicone droplets. The silicone-treated nitrogen passes upwardly through a 100 mesh collector screen 55 separating the mixing chamber from the treatment chamber of tower 47, and thence rises through the chamber, where it meets the downwardly-cascading dry sieve material and impregnates the same. The impregnated sieve is continuously withdrawn at 56 by suction at the bottom of the tower chamber and is thereafter immediately processed into cigarettes as at 57. Any escaping sieve is arrested on the screen 55 to avoid its dropping into the pool 58 of excess silicone and water collected at the bottom of this chamber.

The silicone liquid is absorbed into the voids of the sieve particles and will not evaporate or migrate away from the particles, but will remain indefinitely until the cigarette is used. The silicone characteristic of resisting high temperatures without breaking down chemically will keep it in an inert condition during the smoking of the cigarette so as not to contaminate the smoke. The silicone liquid actually enters into the porous structure of the sieve particle and becomes an integral part of the physical structure of the particle rather than remaining on the surface. It has been found that some change in the surface tension of the molecular sieve will occur, in which surface tension is reduced. It is believed that this may increase the capacity of the molecular sieve for surface capture of certain long-chain hydrocarbons, too large to be adsorbed into the pores of the sieve. The silicone will enhance the capacity of the sieve to capture gaseous hydrocarbons such as benzo-pyrene, and dibenzo-pyrene, which are odorless and tasteless but harmful.

The molecular sieve material 14 illustrated in FIG. 1 is intended to represent a granular sieve in the 30/40 mesh range on the Tyler screen, in a cigarette filter tip. Roughly, the granules are comparable in size to small bird shot or beach sand.

Figure 2:
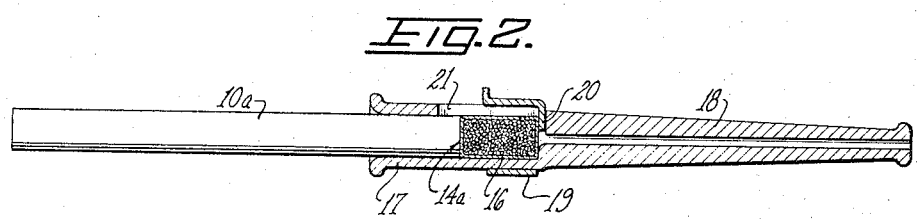
FIG. 2 is an axial sectional view of a cigarette filter for use in a cigarette holder, both shown in axial section.

As an alternative, illustrated in FIG. 2, the invention may be embodied in a separate filter cartridge 14a in which the granular sieve material may be encased in a wrapper 16 of porous paper or the like. The cartridge 14a is of the same diameter as the cigarette 10a to be filtered, both cartridge and cigarette being receivable in the socket 17 of a cigarette holder 18 having a suitable ejector sleeve 19 including an inwardly projecting ejector finger 20 slidably extended through a slot 21 in the socket 17 and engageable with the rear end of the cartridge 14a.

Figure 3:
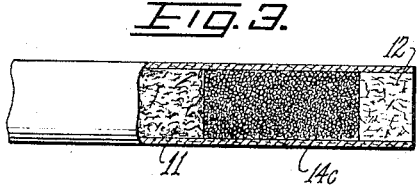

FIG. 3 illustrates how the filter can be embodied in a solid body 14c of highly porous molecular sieve material with sufficient area of irregular interstices extending therethrough to provide for adequate draft through the filter cartridge.

Figure 4:
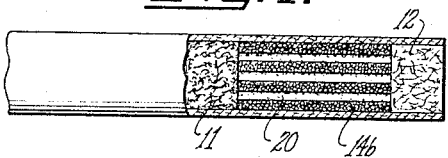

As shown in FIG. 4, the filter cartridge may consist of a geometrical body 14b of solid but porous, molecular sieve material having a plurality of draft passages 20 extending longitudinally therethrough. The molecular sieve material of body 14b is of highly porous character and may be composed of granules adhering to one another.

Figure 5:
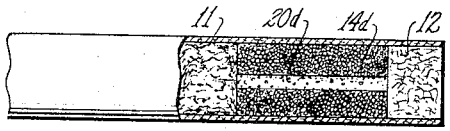
FIGS. 3, 4, 5, 6 and 7 are fragmentary views of cigarettes having filters, shown in axial section, embodying modified forms of the invention.

As shown in FIG. 5, the filter cartridge 14d may be in the form of a collar or tube having a central passage 20d extending therethrough, the highly porous body of molecular sieve material forming a porous wall structure around the passage 20d.

Figure 6:
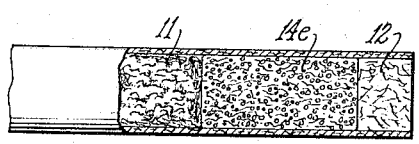

As shown in FIG. 6, the molecular sieve granules may be intermixed with a plurality of cellulose fibers or glass fibers in a mat body of cartridge form indicated at 14c, with the sieve particles adhering to the mat fibers through suitable adhesive bonds.

Figure 7:
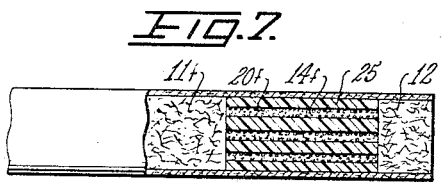

FIG. 7 illustrates another possible modification of the invention wherein the molecular sieve particles 14f are adhesively attached to the internal walls of a plurality of passages 20f extending axially through a cartridge body 25 of non-filtering material which can be substantially non-porous. For example, the cartridge body 25 may be of molded plastic material, utilizing a suitable cured thermosetting resin such as a phenolic aldehyde resin which will not impart disagreeable odors to the hot smoke passing through the passages 20f.

The inner cellulose wad 11f may be coated with fine particles of molecular sieve adhering thereto. In each instance, the outer wad 12 is preferably cured, uncoated cellulose fiber material.

In tests of a cigarette such as that shown in FIG. 1, I have found that the flavor of the smoke drawn through the filter is as pleasing as that of the same tobacco of a non-filter cigarette and considerably less acrid. Tests also have established however that the tars and other harmful ingredients of the smoke are substantially removed to an extent such that any residue of such materials is undetectable in the smoke drawn from the tip of the cigarette.

I claim:

1. A filter cigarette comprising a tubular wrapper; a body of tobacco filling said wrapper for a substantial portion of its length; a barrier wad of porous material adjacent one end of said body of tobacco and spaced from the tip end of the wrapper; and a filter comprising molecular sieve granules disposed between said barrier wad and the tip of the cigarette, said molecular sieve granules being in a substantially moisture-saturated state, and containing in the porous structure thereof a liquid-phase silicone material having an affinity for harmful hydrocarbon components of cigarette smoke, wherein said granules are saturated by the silicone liquid and by moisture to an extent of maximum saturation diminished by only sufficient drying to leave the body of granules in a readily pourable state, the silicone and moisture contents collectively being such as to impart to the sieve a selective filtering characteristic in the ability to remove a high percentage of noxious substances from tobacco smoke coupled with a significantly reduced affinity for the normal moisture content of cigarette tobacco, so as to avoid objectionable drying of the tobacco.

2. A cigarette filter composed of molecular sieve granules in a partially moisture-saturated state, and including, in the pores thereof, silicone liquid having an affinity for gaseous hydrocarbons of cigarette smoke, such as benzopyrenes, wherein said granules are saturated by the silicone liquid and by moisture to an extent of maximum saturation diminished by only sufficient drying to leave the body of granules in a readily pourable state, the silicone and moisture contents collectively being such as to impart to the sieve a selective filtering characteristic in the ability to remove a high percentage of noxious substances from tobacco smoke coupled with a significantly reduced affinity for the normal moisture content of cigarette tobacco, so as to avoid objectionable drying of the tobacco.

3. A cigarette filter as defined in claim 2, wherein the sieve material comprises granules of partially active molecular sieve loaded with a di-methyl polysiloxane silicone liquid for removing harmful components of the cigarette smoke, selected from the group of silicones identified by the general formula

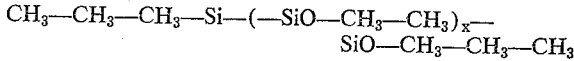

where submarginal $x$ indicates that this general formula may be expanded.

4. A cigarette filter as defined in claim 2, wherein said granules are of a size within the range of 30/40 mesh on a Tyler screen.

5. A cigarette filter as defined in claim 2, wherein the sieve is in a substantially moisture-saturated state and said silicone liquid consists of a liquid-phase di-methyl polysiloxane.

6. A cigarette filter as defined in claim 2, wherein said sieve consists of granules having a cubic crystal structure, characterized by a three-dimensional network with mutually connected intra-crystalline voids accessible through pore openings which will admit molecules with critical dimensions up to 9 angstroms, said granules being restricted to a range of sizes between 30 and 40 mesh on a Tyler screen.

References Cited

UNITED STATES PATENTS 2,839,065   6/1958   Milton _____ 131—10

FOREIGN PATENTS 721,162   12/1954   Great Britain.
753,203   7/1956   Great Britain.
755,075   8/1956   Great Britain.
932,570   7/1963   Great Britain.

SAMUEL KOREN, *Primary Examiner.*

D. J. DONOHUE, *Assistant Examiner.*